United States Patent Office 3,373,219
Patented Mar. 12, 1968

3,373,219
PROCESS FOR THE SELECTIVE HYDRO-
GENATION OF C₄-FRACTIONS
Walter Krönig, Wilhelm Mayrhofer, and Gerhard Scharfe,
Leverkusen, and Kurt Halcour, Cologne-Stammheim,
Germany, assignors to Farbenfabriken Bayer Aktienge-
sellschaft, Leverkusen, Germany, a corporation of
Germany
No Drawing. Filed Oct. 26, 1966, Ser. No. 589,506
Claims priority, application Germany, Nov. 30, 1965,
F 47,785
7 Claims. (Cl. 260—681.5)

ABSTRACT OF THE DISCLOSURE

The disclosure concerns selective hydrogenation with gaseous hydrogen of $C_4$-acetylenes in butadiene-containing $C_4$-fractions (e.g., at 15–50° C. and e.g., at 2–12 atm.) in trickle-phase through fixed palladium/lithium aluminum spindle-containing carrier catalysts prepared by heating lithium solution-impregnated highly active aluminum oxide (e.g., at 900–1300° C.) to form the spinel followed by palladium solution-impregnation thereof and reduction to palladium metal thereon.

---

This invention relates to a process for the selective hydrogenation of $C_4$-fractions.

It has been found that the selective hydrogenation of $C_4$-fractions, e.g. the hydrogenation of $C_4$-acetylenes in butadiene-containing $C_4$-fractions by hydrogenation in a trickle-phase at an elevated pressure in the presence of fixed palladium/carrier catalysts, can be carried out in particular advantage by using catalyst supports at least 20% by weight of which consist of lithium aluminum spinel.

A suitable catalyst for this process is palladium applied to the support in quantities of from about 0.05% to 2% by weight, preferably from 0.1% to 1% by weight. The support may contain in addition to the Li-Al spinel, constituents such as aluminum oxide or silica, silicates and so on, although the spinel content of the catalyst support should be at least 20% and preferably at least 40% by weight. Supports consisting almost entirely of lithium aluminum spinel have proved to be particularly suitable.

To prepare the lithium aluminum spinel, it has proved to be of advantage to use highly active aluminum oxide with inner surfaces of approximately 200 to 300 m.²/g. as the starting material, and to convert it into the spinel by reaction with compounds of lithium. The aluminum oxide may be used in piece form (chips, pellets, spheres), impregnated with a solution of a lithium compound (salts, particularly salts of organic acids, in particular the formate, and hydroxides), optionally after intermediate thermal decomposition of the salt. The spinel formation may be completed by from one to ten hour's heating to 900° C. to 1300° C. Similarly, finely powdered aluminum oxide of the same kind may be used as a starting material, and the catalyst formed after impregnation or decomposition of the salt, followed by conversion into the spinel by heat treatment. The catalyst supports thus obtained may have inner surfaces (BET-method) of e.g. preferably below 100 m.²/g. preferably 1 to 60 m.²/g., and average pore diameters of between 200 and 800 A. The palladium is advantageously applied to the supports in the form of an aqueous solution of sodium palladium chloride, and the salt is reduced to palladium metal with reducing agents such as, for example, hydrazine, formic acid and formaldehyde. It is also possible to start from other palladium salts such as nitrates or acetates, for example, and to complete the reduction at an elevated temperature, for example, at a temperature in the range of from 100° C. to 300° C., with gases containing hydrogen, optionally after the salts have been converted beforehand into oxides.

Tubular reactors which contain the catalyst in the tubes are advantageously used for carrying out the selective hydrogenation cycle. The tubes preferably have internal diameters of between 25 mm. and 75 mm. and lengths of from 1 to 6 metres. The tubes are advantageously surrounded by a cooling jacket for which water is suitable, although it is even possible to use boiling liquids such as $C_3$- or $C_4$-hydrocarbons, for example. The $C_4$-hydrocarbons to be hydrogenated are introduced downwardly into the tubes, steps being taken to ensure that all the tubes admit the material to be hydrogenated as uniformly as possible. A hydrogen atmosphere, substantially in a static state, is maintained in the tubes. The lower end of the reactor is adjoined, optionally after a condenser, by a separator in which the liquid hydrogenation product and the hydrogen containing gas separate from one another. Small quantities of the gas can be released from the gas zone of this separator, in which case it is usually sufficient to release the gas in such quantities that the hydrogen present in its amounts up to 20% of the chemically combined hydrogen.

The $C_4$-hydrocarbons to be hydrogenated may be washed prior to hydrogenation with alkaline liquids such as, for example, aqueous sodium hydroxide or potassium hydroxide solution and then with water. Even after they have been washed, the hydrocarbons may contain organic sulphur compounds, principally methyl mercaptan, for example in quantities of up to 20 p.p.m. of sulphur. The hourly throughput of $C_4$-fractions per litre of reaction zone can amount, for example, to between 5 and 35 kg., preferably between 15 and 25 kg. The temperature at the inlet of the reactor can be between approximately 15° C. and 25° C. The temperature of the cooling jacket surrounding the catalyst tubes is selected in such a way that the temperature of the hydrogenation product leaving from the lower end of the tubes is below 50° C., preferably between 20° C. and 45° C. Pressures in the range of from 2 to 12 atmosphers, for example, have proved to be suitable. Pure hydrogen may be used as the hydrogen gas, although it is possible to use gases preferably containing at least 60% of hydrogen. The gases containing hydrogen should be free of hydrogen sulphide, carbon oxysulphide or carbon monoxide. The extent to which the acetylenes are removed is largely governed by the hydrogen pressure selected, any increase in the hydrogen pressure being accompanied by an increase in the ratio of removal of the acetylenes. At the same time, however, the hydrogenation of butadiene is also promoted by a higher hydrogen pressure. For this reason, the pressure is generally selected in such a way that the acetylenes are removed to just the required extent, for example down to a level of between 20 and 300 p.p.m. The invention is illustrated by the following examples.

Example 1

The catalyst was prepared as follows: aluminum oxide in the form of 3 to 4 mm.-diameter spheres with an inner surface area of 230 m.²/g., was impregnated with a quantity of an aqueous solution of lithium formate which was such that the completed catalyst contained 2.6% by weight of lithium. This support was heated to 1050° C. for a period of 4 hours during which spinel formation was completed. 0.5% by weight of palladium metal was applied to this support, which had an inner surface area of 31 m.²/g., by impregnating the spheres with an aqueous solution of sodium palladium chloride, precipitating the palladium with hydrazine hydrate, washing and drying. This catalyst was introduced into a vertical tube 1500 mm. long with an internal diameter of 20 mm. The $C_4$-fraction used had been obtained by fractionating the gases formed during the pyrolysis of light petrol. This $C_4$-fraction was initially washed at room temperature with 10% aqueous sodium hydroxide and then with water. The fraction thus washed contained organic sulphur compounds in a quantity of 10 p.p.m. of sulphur. The composition of the $C_4$-fraction was as follows:

Constituent:
- Butanes _____ percent by weight__ 7.7
- Butenes _____do____ 64.3
- 1,3-butadiene _____do____ 27.3
- Ethylacetylene _____p.p.m__ 600
- Vinylacetylene _____p.p.m__ 1300

Hydrogenation was carried out with electrolytic hydrogen under a total pressure of 5.0 atms., in an almost static hydrogen atmosphere, by introducing the starting material downwardly into the reactor whereby it trickled down over the catalyst in the hydrogen atmosphere and was separated from the gas in a separator beneath the catalyst. The reaction temperature was 20° C. at the inlet of the reactor, and 40° C. at the end of the catalyst layer. The quantity at which the hydrogen was used was regulated in such a way that 20% of the hydrogen in excess of the amount corresponding to the chemical consumption was introduced and released at the end of the reaction. The hourly throughput of $C_4$-fraction was 20 kg./litre of catalyst. The hydrogenation product contained 60 p.p.m. of vinylacetylene and 120 p.p.m. of ethylacetylene, whilst the butadiene loss amounted to 4%. The same results were also obtained after 1 month's continuous operation under exactly the same conditions.

Had hydrogenation been carried out with a catalyst in which 0.5% of palladium was applied to heat-treated aluminum oxide in the manner described, with the procedure otherwise unaltered, results similar to those described would have been obtained at the beginning of the run, although after 7 days' operation at a pressure of 9 atmospheres, the hydrogenation product would have contained 200 p.p.m. of ethylacetylene and 190 p.p.m. of vinylacetylene, whilst the butadiene loss would have totalled 10%.

*Example 2*

The catalyst was prepared as follows: aluminum oxide in the form of 3 to 4 mm.-diameter spheres, with a surface of 288 m.$^2$/g., was impregnated with a quantity of an aqueous solution of lithium formate such that the completed catalyst contained 2.6% by weight of lithium. The carrier or support thus impregnated was heated to 1150° C. over a period of 8 hours during which spinel formation was completed. 0.1% of palladium was applied to this support, which had an intrinsic surface area of 15 m.$^2$/g., by impregnating the spheres with an aqueous sodium-palladium chloride solution, precipitating the palladium with alkaline hydrazine hydrate, washing and drying.

Hydrogenation was carried out as described in Example 1 with the same, freshly redistilled $C_4$-product. The reaction temperature was 20° C. at the inlet of the reactor and 22° C. at its outlet. The hydrogenation product contained 70 p.p.m. of vinylacetylene and 120 p.p.m. of ethylacetylene, whilst the butadiene loss totalled 3.2%.

*Example 3*

In order to prepare the Li-aluminum spinel, aluminum oxide in the form of 3 to 4 mm.-diameter spheres with an inner surface of 288 m.$^2$/g. was impregnated with a quantity of an aqueous solution of lithium formate such that the completed catalyst support contained 1.5% by weight of lithium. The carrier thus impregnated was heated to 1050° C. for a period of 4 hours during which the spinel was formed. 0.5% by weight of palladium was applied to this support which had a surface area of 50 m.$^2$/g., in the manner described in Example 2.

Hydrogenation was carried out in the same reactor and under the same conditions as those described in Example 2. A freshly redistilled $C_4$-fraction was used which had first of all been washed at room temperature with 10% aqueous sodium hydroxide and then with water. The composition of the $C_4$-fraction was as follows:

- Butanes _____ percent by weight__ 5.0
- Butenes _____do____ 55.3
- 1,3-butadiene _____do____ 39.1
- Ethylacetylene _____p.p.m__ 1,195
- Vinylacetylene _____p.p.m__ 3,174

The hydrogenation product contained 140 p.p.m. of vinylacetylene and 200 p.p.m. of ethylacetylene, whilst the butadiene loss was 2.8%.

What we claim is:

1. Process for the selective hydrogenation of $C_4$-acetylenes present in butadiene-containing $C_4$-fractions which comprises hydrogenating such $C_4$-acetylene in the butadiene-containing $C_4$-fraction in trickle phase at elevated pressure in the presence of a fixed palladium/carrier catalyst, with at least 20% by weight of the catalyst carrier consisting of lithium aluminum spinel.

2. Process according to claim 1 wherein $C_4$-acetylenes contained in the butadiene-containing $C_4$-fraction are selectively hydrogenated with gaseous hydrogen maintained in substantially static state.

3. Process according to claim 1 wherein the carrier also contains aluminum oxide.

4. Process according to claim 3 wherein the carrier has a surface area between about 1–100 m.$^2$/g.

5. Process according to claim 4 wherein the palladium content of the catalyst is between about 0.05–2% by weight.

6. Process for the selective hydrogenation substantially of the $C_4$-acetylene content of butadiene-containing $C_4$-fractions according to claim 1, which comprises passing such butadiene-containing $C_4$-fraction in trickle phase through a fixed palladium/carrier catalyst, in which the catalyst carrier consists of lithium aluminum spinel to the extent of at least about 20% by weight, in contact with gaseous hydrogen at elevated pressure to hydrogenate substantially the $C_4$-acetylene content present.

7. Process according to claim 6 wherein said gaseous hydrogen is maintained in substantially static state, the pressure is between about 2–12 atmospheres, the temperature is between about 15–50° C., the palladium content of the catalyst is between about 0.05–2% by weight, and the carrier has a surface area between about 1–100 m.$^2$/g.

References Cited

UNITED STATES PATENTS

| | | | |
|---|---|---|---|
| 3,036,137 | 5/1962 | Challis et al. | 260—677 |
| 3,075,917 | 1/1963 | Kronig et al. | 208—255 |
| 3,091,654 | 5/1963 | Kestner | 260—681.5 |
| 3,126,426 | 3/1964 | Turnquest et al. | 260—683.3 |
| 3,200,167 | 8/1965 | Reich | 260—681.5 |
| 3,291,755 | 12/1966 | Haensel et al. | 252—464 |
| 2,474,440 | 6/1949 | Smith et al. | 260—683.3 |

FOREIGN PATENTS 974,038  11/1964  Great Britain.

DELBERT E. GANTZ, *Primary Examiner.*

G. E. SCHMITKONS, *Assistant Examiner.*